United States Patent
Wu et al.

(10) Patent No.: US 10,401,529 B2
(45) Date of Patent: Sep. 3, 2019

(54) FAST-CHANGING DIP FORMATION RESISTIVITY ESTIMATION

(71) Applicant: HALLIBURTON ENERGY SERVICES, INC., Houston, TX (US)

(72) Inventors: Dagang Wu, Katy, TX (US); Luis E. San Martin, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/510,551

(22) PCT Filed: Oct. 17, 2014

(86) PCT No.: PCT/US2014/061186
§ 371 (c)(1),
(2) Date: Mar. 10, 2017

(87) PCT Pub. No.: WO2016/060690
PCT Pub. Date: Apr. 21, 2016

(65) Prior Publication Data
US 2017/0254921 A1    Sep. 7, 2017

(51) Int. Cl.
*G01V 3/38* (2006.01)
*E21B 47/00* (2012.01)
(Continued)

(52) U.S. Cl.
CPC ............... *G01V 3/38* (2013.01); *E21B 47/00* (2013.01); *E21B 49/00* (2013.01); *G01V 3/20* (2013.01);
(Continued)

(58) Field of Classification Search
None
See application file for complete search history.

(56) References Cited

U.S. PATENT DOCUMENTS

| 5,867,806 A | 2/1999 | Strickland et al. |
| 6,470,274 B1 | 10/2002 | Mollison et al. |

(Continued)

FOREIGN PATENT DOCUMENTS

| WO | 2013/015789 | 1/2013 |
| WO | 2014/011190 | 1/2014 |

OTHER PUBLICATIONS

Z. J. Zhang, 1-D Inversion of Triaxial Induction Logging in Layered Anisotropic Formation, Well Logging Laboratory, University of Houston, Houston, TX 77204, USA Progress in Electromagnetics Research B, vol. 44, 383-403, 2012.*

(Continued)

*Primary Examiner* — Tung S Lau
(74) *Attorney, Agent, or Firm* — Benjamin Fite; C. Tumey Law Group PLLC

(57) ABSTRACT

Fast-changing dip formation resistivity estimation methods and systems, including a formation resistivity estimation method that includes estimating an initial horizontal resistivity based upon acquired formation logging data and determining an initial value set of one or more value sets. The method further includes determining each additional value set of the one or more value sets using a 1-dimensional inversion initialized with a previously determined value set of the one or more value sets, and displaying a final value set of the one or more value sets. Each of the 1-dimensional inversions is performed using a cross-bedded formation model, and each of the one or more value sets includes one or more parameters selected from the group consisting of a horizontal resistivity, a vertical resistivity, a formation dip angle, a formation azimuth angle, a tool inclination angle, a tool azimuth angle and a depth.

26 Claims, 7 Drawing Sheets

(51) Int. Cl.
*G01V 3/28* (2006.01)
*E21B 49/00* (2006.01)
*G01V 3/20* (2006.01)
*E21B 47/024* (2006.01)
*E21B 47/04* (2012.01)

(52) U.S. Cl.
CPC .............. *G01V 3/28* (2013.01); *E21B 47/024* (2013.01); *E21B 47/04* (2013.01)

(56) References Cited

U.S. PATENT DOCUMENTS

| | | |
|---|---|---|
| 6,502,036 B2 | 12/2002 | Zhang et al. |
| 6,643,589 B2 | 11/2003 | Zhang et al. |
| 6,925,384 B2 | 8/2005 | Frenkel et al. |
| 6,944,546 B2* | 9/2005 | Xiao ................... G01V 11/00 702/6 |
| 7,317,991 B2 | 1/2008 | Wang et al. |
| 8,360,146 B2 | 1/2013 | Yin |
| 8,433,518 B2 | 4/2013 | Omeragic et al. |
| 2005/0049792 A1 | 3/2005 | Yu et al. |
| 2005/0075789 A1* | 4/2005 | Xiao ................... G01V 11/00 702/6 |
| 2005/0140373 A1 | 6/2005 | Li et al. |
| 2006/0161350 A1 | 7/2006 | Wang |
| 2007/0027629 A1* | 2/2007 | Hassan ................. G01V 11/00 702/11 |
| 2008/0030196 A1 | 2/2008 | Bespalov et al. |
| 2009/0005994 A1* | 1/2009 | Srnka ................... G01V 3/12 702/7 |
| 2009/0082969 A1* | 3/2009 | Rabinovich ............ G01V 3/38 702/7 |
| 2010/0230095 A1 | 9/2010 | Yin |
| 2013/0080059 A1* | 3/2013 | Kumar .................. G01V 3/20 702/7 |
| 2014/0257703 A1* | 9/2014 | Wu ....................... G01V 3/28 702/7 |
| 2016/0245952 A1* | 8/2016 | Dupuis .................. G01V 3/18 |

OTHER PUBLICATIONS

Changchun Yin, Geoelectrical inversion for a one-dimensional anisotropic model and inherent non-uniqueness, 2000, p. 11-23.*
PCT International Search Report and Written Opinion, dated Jul. 15, 2015, Appl No. PCT/US2014/061186, "Fast-Changing Dip Formation Resistivity Estimation," Filed Oct. 17, 2014, 10 pgs.
Wang, Hanning, et al., "Sensitivity Study and Inversion of the Fully-Triaxial Induction Logging in Cross-Bedded Anisotropic Formation," SEG-2008-0284, 2008 SEG Annual Meeting, Nov. 9-14, 2008, pp. 284-288.

* cited by examiner

FAST-CHANGING DIP FORMATION RESISTIVITY ESTIMATION

BACKGROUND

Modern petroleum drilling and production operations demand a great quantity of information relating to the parameters and conditions downhole. Such information typically includes the location and orientation of the borehole and drilling assembly, earth formation properties, and parameters of the downhole drilling environment. The collection of information relating to formation properties and downhole conditions is commonly referred to as "logging." Logging can be performed during the drilling process itself (hence the term "logging while drilling" or "LWD," which is frequently used interchangeably with the term "measurement while drilling" or "MWD"), or at various times during the drilling process with the drillstring removed using a wireline logging tool.

Various measurement tools exist for use in logging. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of multiple receive signals are compared to each other to measure the formation resistivity.

When plotted as a function of depth or tool position in the borehole, the logging tool resistivity measurements are termed "resistivity logs." Such logs may provide indications of hydrocarbon concentrations and other information useful to drillers and completion engineers. The resistivity measurements presented in the logs are a complex function of formation anisotropy and dip angle, as well as the logging tool's azimuthal orientation. A number of existing methods based on multi-component induction tool measurements (e.g., triaxial induction tools) may be used to estimate resistivity in transverse-isotropic formations without cross-beddings. However, such methods produce questionable results when applied to cross-bedded formations. Cross-bedding occurs when material is deposited on an inclined surface within a depositional environment that contained a flowing medium such as water or wind, producing groups of inclined formation layers. Because the dip angle of such cross-bedded formations can vary significantly from group to group, the estimation of cross-bedded formation resistivity can be difficult. While methods do exist for estimating formation resistivity within cross-bedded formations, such methods are typically radial 1-dimensional or homogeneous techniques that do not account for layer or formation boundaries and produce significant errors from the effects of shoulder beds. See, e.g., Yin, Hezhu, U.S. Pat. No. 8,360,146 and Wang, Tsili et al., U.S. Pat. No. 7,317,991. Still another method proposes the use of 3D forward modeling in a single-stage inversion that solves for all unknown parameters at once. See Wang, Hanming et al., *Sensitivity Study and Inversion of the Fully-Triaxial Induction Logging in Cross-Bedded Anisotropic Formation*, SEG Technical Program Expanded Abstracts, 284 (2008). However, this method requires large computation times and processing resources, making such an approach impractical for use in real-time applications.

BRIEF DESCRIPTION OF THE DRAWINGS

Accordingly, there are disclosed herein methods and systems for estimating resistivity in formations with fast changing dip angles. In the drawings.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

The paragraphs that follow describe illustrative methods and systems for resistivity estimation of formations with fast-changing dip angles. Illustrative well logging environments suitable for such methods and systems is first described, followed by a description of an illustrative multi-component induction tool that acquires formation logging data suitable for use by the disclosed methods and systems. The positional and mathematical relationships between the various component antennas of the tool are also described. Several illustrative formation resistivity estimation methods are then described, as well as techniques for determining the applicability of specific inversions. The estimation methods are presented within the context of an illustrative system and a software-based implementation by said system. Together, the system and software may perform the disclosed estimation methods by implementing a decision tree that operates to decide which inversion method is used to estimate the formation's resistivity. It should be noted that although throughout this disclosure both formation conductivity $\sigma$ and resistivity $\rho$ are referenced, one is just the inverse of the other (i.e., $\sigma=1/\rho$). Thus, the disclosed systems and methods are equivalent, regardless of whether described in terms of resistivity or conductivity.

Figure 1A:
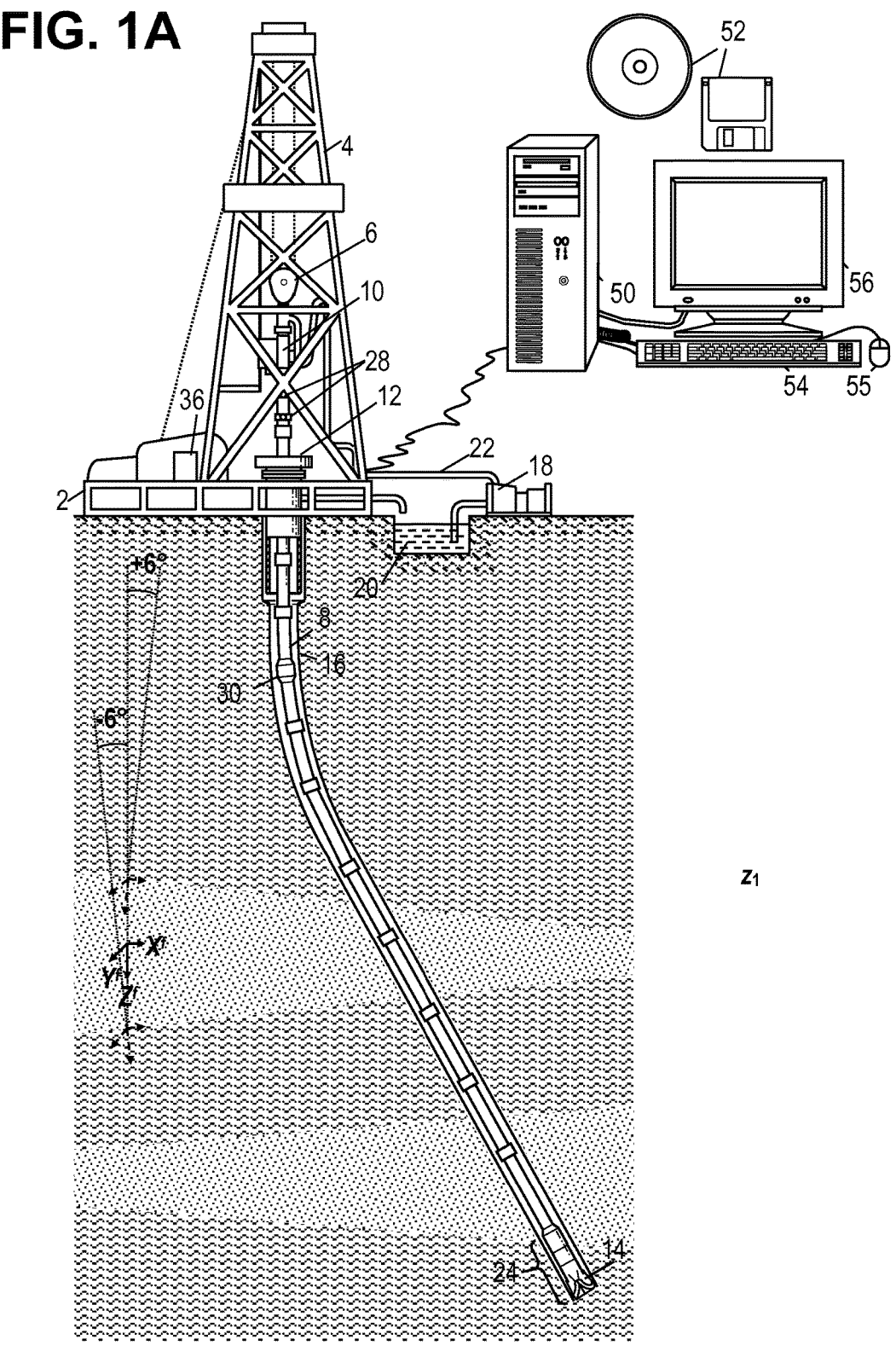
FIG. 1A is a schematic diagram of an illustrative drilling environment within a formation with a fast changing dip angle.

The disclosed methods and systems are best understood in the context of the larger systems in which they operate. Accordingly, FIG. 1A shows an illustrative drilling environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a borehole 16 that passes through various formation layers. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly 24 that includes a mud motor and one or more "drill collars" (thick-walled steel pipe) that provide weight and rigidity to aid the drilling process. Some of these drill collars include built-in logging instruments to gather measurements of various drilling parameters such as location, orientation, weight-on-bit, borehole diameter, etc. The tool orientation may be specified in terms of a tool face angle (i.e., rotational orientation or azimuth), an inclination angle and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

Also included in bottom-hole assembly 24 is a telemetry sub that maintains a communications link with the surface. Mud pulse telemetry is one common telemetry technique for transferring tool measurements to surface receivers and receiving commands from the surface, but other telemetry techniques can also be used. For some techniques (e.g., through-wall acoustic signaling) the drill string 8 includes one or more repeaters 30 to detect, amplify, and re-transmit the signal. At the surface, transducers 28 convert signals between mechanical and electrical form, enabling a network interface module 36 to receive the uplink signal from the telemetry sub and (at least in some embodiments) transmit a downlink signal to the telemetry sub. A data processing system 50 receives a digital telemetry signal, demodulates and processes the signal, and displays the tool data or well logs. Software (represented in FIG. 1A as non-transitory information storage media 52) governs the operation of system 50. A user can interact with system 50 and its software 52 via one or more input devices 54 and 55 and one or more output devices 56. In some system embodiments, a driller employs the system to make geosteering decisions and communicate appropriate commands to the bottom-hole assembly 24.

The bottom-hole assembly 24 may still further include a steering mechanism which the driller can employ to change the borehole's trajectory in response to their analysis of the logging measurements. Illustrative steering mechanisms include controllable fins, drilling plows, or bent subs. A rotary steerable system (RSS) may be coupled to such steering mechanisms to enable geosteering even as the drillstring continues rotating.

Figure 1B:
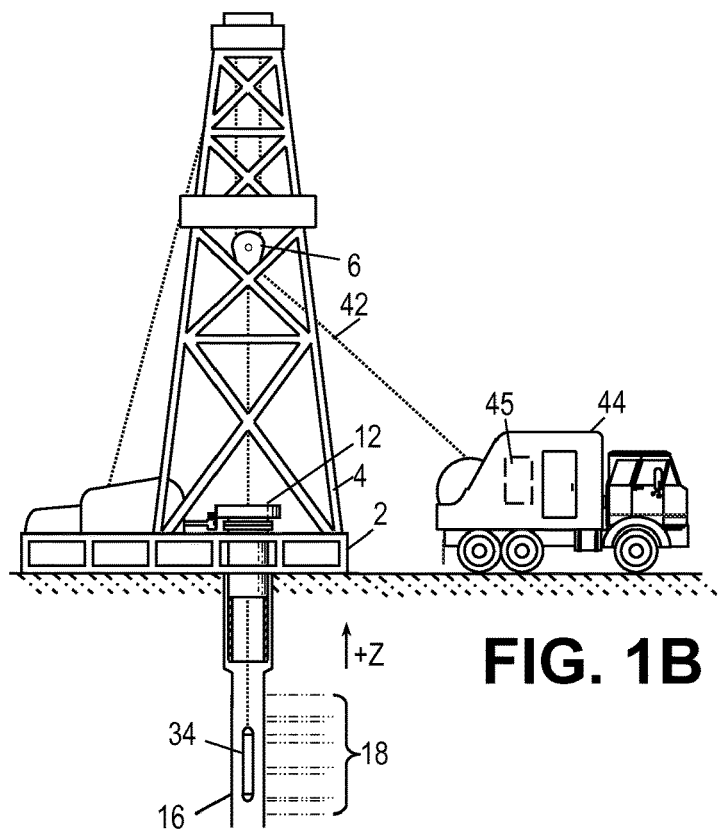
FIG. 1B is a schematic diagram of an illustrative wireline logging environment.

At various times during the drilling process, the drill string 8 may be removed from borehole 16 as shown in FIG. 1B. Once the drill string has been removed, logging operations can be conducted using a wireline logging tool 34, i.e., a sensing instrument sonde suspended by a cable 42 having conductors for transporting power to the tool and telemetry from the tool to the surface. A wireline logging tool 34 may have pads and/or centralizing springs (not shown) to maintain the tool near the axis of the borehole as the tool is pulled uphole. A surface logging facility 44 collects measurements from the logging tool 34, and includes a computer system 45 for processing and storing the measurements gathered by the logging tool.

Figure 1C:
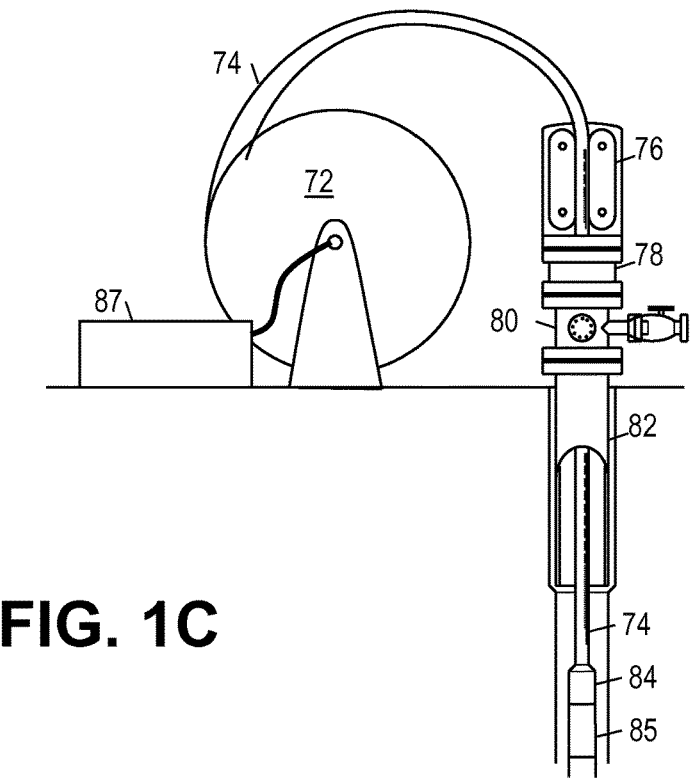
FIG. 1C is a schematic diagram of an illustrative tubing-conveyed logging environment.

An alternative logging technique is logging with coil tubing. FIG. 1C shows an illustrative coil tubing-conveyed logging system in which coil tubing 74 is pulled from a spool 72 by a tubing injector 76 and injected into a well through a packer 78 and a blowout preventer 80 into the well 82. (It is also possible to perform drilling in this manner by driving the drill bit with a downhole motor.) In the well, a supervisory sub 84 and one or more logging tools 85 are coupled to the coil tubing 84 and optionally configured to communicate to a surface computer system via information conduits or other telemetry channels. An uphole interface 87 may be provided to exchange communications with the supervisory sub and receive data to be conveyed to a surface computer system such as, for example, data processing system 50 of FIG. 1A.

Figure 2A:
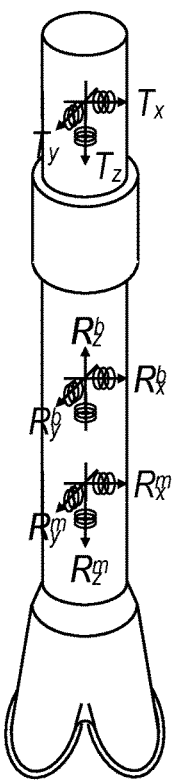
FIG. 2A is a schematic diagram of an illustrative triaxial induction resistivity LWD/MWD tool.
Figure 2B:
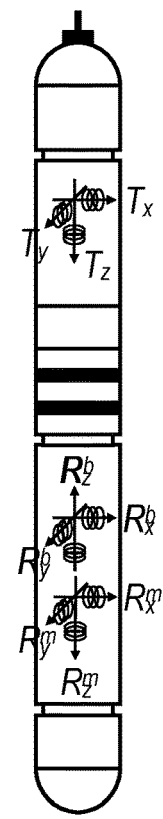
FIG. 2B is a schematic diagram of an illustrative triaxial induction resistivity wireline logging tool.

The various logging tools described can include any number of modules that measure properties of the surrounding formation. One such module is a multi-component induction module, examples of which are shown in both FIG. 2A (as part of an LWD/MWD tool) and FIG. 2B (as part of a wireline logging tool). In the examples shown, three sets of mutually orthogonal antennas (T, $R^m$ and $R^b$) are positioned along the Z axis of the logging tool. In at least some illustrative embodiments, one set operates as a transmitter, another set as a main receiver and the third set as a bucking receiver. The bucking receiver antennas are electrically coupled to the corresponding main receiver antennas with opposite windings so as to cancel signals travelling directly from the transmitter to the receivers while still allowing measurement of voltages induced in the formation by the transmitter. Such voltages may be expressed as a 3×3 tensor for each measurement sample, as shown in equation (1):

$$V = [V_{ij}]_{3\times 3} = \begin{bmatrix} V_{xx} & V_{xy} & V_{xz} \\ V_{yx} & V_{yy} & V_{yz} \\ V_{zx} & V_{zy} & V_{zz} \end{bmatrix}, i, j = x, y, z, \qquad (1)$$

where $V_{ij}$ is the voltage measured at a receiver antenna with orientation j in response to a signal transmitted by a transmitter antenna with orientation i. In at least some illustrative embodiments, the voltages measured in the receiver antennas and expressed in equation (1) are calibrated into apparent formation conductivities to obtain the apparent conductivity tensor of equation (2):

$$\sigma^a = [\sigma_{ij}]_{3\times 3} = \begin{bmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{bmatrix}, i, j = x, y, z, \qquad (2)$$

where $\sigma^a$ is the apparent conductivity tensor expressed relative to the measurement tool's coordinate system ($X^t$, $Y^t$, $Z^t$) and $\sigma_{ij} = V_{ij}/K_{ij}^V$, where $K_{ij}^V$ is the calibration factor of the coupling conductivity as determined by a calibration procedure. Further, if the multi-component induction tool is approximated as a point dipole source, the calibration factors can be set to $K_{xx}^V = K_{yy}^V = K_{xy}^V = K_{yx}^V$ and $K_{xz}^V = K_{yz}^V = K_{zx}^V = K_{zy}^V$, which results in only three independent calibration factors $K_{zz}^V$, $K_{xx}^V$ and $K_{xz}^V$ for a receiver sub-array operated at a given frequency. Multi-component induction tool calibration procedures are well known in the art and are not discussed further.

Formation conductivity is generally anisotropic and can be characterized by its "vertical" and "horizontal" components, though such components need not be truly vertical and horizontal, but rather, due to geological activity, may vary with the dip of the formation beds. In some formations the dip angle can vary quickly as a function of depth from bed to bed, particularly for formations with non-parallel bed boundaries. Such rapid variation is illustrated by the example formation coordinate axes shown in FIG. 1A, where the dip angle (taken here as the normal to a given bed boundary) of one of the formation layers shown changes a full 12 degrees from one bed to the next.

At least in part to address this rapid change in dip angle, the systems and methods disclosed approximate the fast-changing dip angle formations using a horizontally layered cross-bedded formation model. In a horizontally layered cross-bedded formation, the bed boundaries are oriented horizontally but the orientation of the strata within a layer may be inclined. This results in inclined horizontal and vertical conductivities within each layer. Because the bed boundaries are all horizontal, a single formation coordinate system is used, with the variations in vertical and horizontal conductivity orientation resulting from the fast changing dip angle being modeled by the conductivity orientation changes of the cross-bedded layers. This is shown by the illustrative conductivity orientations presented in FIG. 3.

Figure 3:
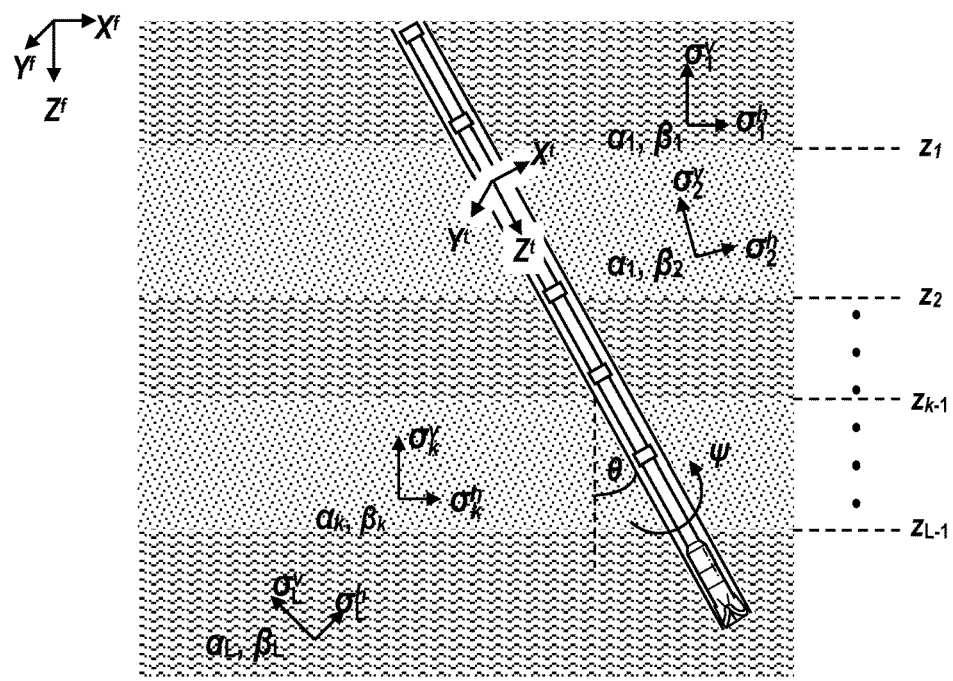
FIG. 3 is a diagram showing an example of a horizontally layered cross-bedded formation.

As also shown in the example of FIG. 3, each formation layer k is characterized by its horizontal conductivity $\sigma_k^h$, vertical conductivity $\sigma_k^v$, bed boundary position $z_k$, cross-bedding dip angle $\alpha_k$ and azimuth angle $\beta_k$. The dip angle is measured between the cross-bedding's z-axis (i.e., the direction of "vertical" conductivity) and the normal of the bed boundaries (i.e., the common formation $Z^f$ axis). The cross-bedding's azimuth angle is measured between the formation bed boundary's $X^f$ axis and a projection of the cross-bedding's z-axis onto the boundary's x-y plane. The $X^f$ axis is oriented in the direction of the greatest upward bed boundary inclination or northward for a horizontal bed boundary. The apparent conductivity tensor for each bed shown in FIG. 3 can be expressed as:

$$\sigma_k = R_{cross} \times R_{formation}^{-1} \times \begin{bmatrix} \sigma_k^h & & \\ & \sigma_k^h & \\ & & \sigma_k^v \end{bmatrix} \times R_{formation} \times R_{cross}^{-1}, \quad (3)$$

where $R_{cross}$ and $R_{formation}$ are Euler rotation matrices for the cross-bedding angles relative to the formation and the formation angles relative to the tool, expressed as:

$$R_{cross} = \begin{bmatrix} \cos\alpha_k \cos\beta_k & \cos\alpha_k \sin\beta_k & -\sin\sigma_k \\ -\sin\beta_k & \cos\beta_k & 0 \\ \sin\alpha_k \cos\beta_k & \sin\alpha_k \sin\beta_k & \cos\alpha_k \end{bmatrix}, \quad (4)$$

and $$R_{formation} = \begin{bmatrix} \cos\theta_k \cos\varphi_k & \cos\theta_k \sin\varphi_k & -\sin\theta_k \\ -\sin\varphi_k & \cos\varphi_k & 0 \\ \sin\theta_k \cos\varphi_k & \sin\theta_k \sin\varphi_k & \cos\theta_k \end{bmatrix}, \quad (5)$$

where $\theta_k$ is the tool inclination angle measured between the tool axis and the normal of the corresponding bed boundary where the tool crosses said boundary (see FIG. 3), and wherein $\psi_k$ is the tool azimuth angle is measured between the formation bed boundary's x-axis (previously described) and a projection of the tool's $Z^t$ axis onto the boundary's x-y plane. Based on the above, measurements taken by a multicomponent induction tool, regardless of tool orientation, can be combined with a horizontally layered cross-bedded formation model to derive estimated formation parameter value sets. In at least some illustrative embodiments, such values sets may each be expressed as an estimated parameter vector P. For a formation traversed by a drillstring as shown in the example of FIG. 3 (where the tool's inclination and azimuth angles are the same for all bed boundaries) the parameter vector is expressed as:

$$P=[\sigma_1^h,\sigma_1^v,\alpha_1,\beta_1, \ldots \sigma_k^h,\sigma_k^v,\alpha_k,\beta_k, \ldots \sigma_L^h,\sigma_L^v,\alpha_L,\beta_L,z_1,z_2, \ldots z_k, \ldots z_{L-1},\theta,\varphi]^T, \quad (6)$$

where L is the total number of foundation bed layers and the superscript "T" indicates transposition. In the more general case where the drillstring is changing direction as it traverses the formation, each layer may be further defined by a tool inclination angle $\theta_k$ and tool azimuth angle $\psi_k$ associated with each corresponding layer k as part of the parameter vector.

In at least some illustrative embodiments, the derivation of the above-described parameter vector is achieved using a multi-stage inversion, wherein at least some of the parameter values estimated by one stage are used as initial values for a subsequent stage. Further, early stages may fix several parameter values, with subsequent stages constraining fewer values until none of the parameter values are held fixed. This multi-stage approach using initially constrained values allows 0-dimensional and 1-dimensional inversions to be used with fewer variables, thus enabling the inversion to converge more quickly than 3-dimensional inversions designed to estimate all of the parameters in a single stage. The paragraphs that follow describe three different illustrative multi-stage inversion methods for estimating the parameter vector P, as well as illustrative hardware and software for performing the inversions.

Figure 4:
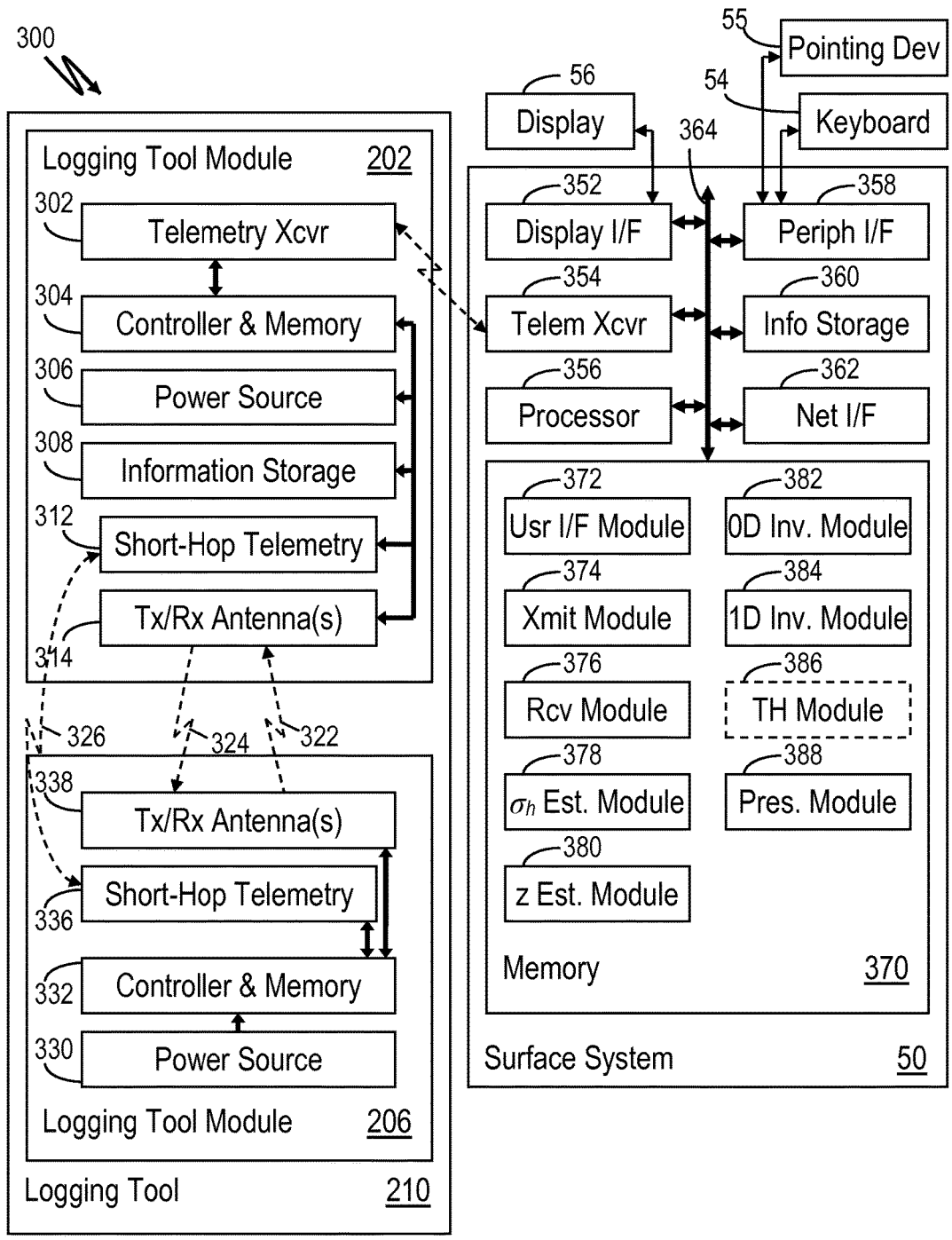
FIG. 4 is a block diagram of an illustrative logging tool and a surface system.

FIG. 4 is a block diagram of illustrative electronics for a logging system 300 suitable for implementing the above-described multi-stage inversions, as well as the preceding formation parameter measurements and data collection. The system includes a logging tool 210 that includes logging tool modules 202 and 206, as well as a surface system 50. Surface system 50 is suitable for collecting, processing and displaying logging data via display 56, and in at least some embodiments generates formation resistivity logs from the logging data measurements and displays them, e.g., via display 56 or via a hard copy, such as a paper printout. A user may interact with the system via keyboard 54 and pointing device 55 (e.g., a mouse) to send commands to the logging tool 210 to steer the drillstring in response to the received data. If desired, surface system 50 can be programmed to send such commands automatically in response to logging data measurements, thereby enabling surface system 50 to serve as an autopilot for the drilling process.

Located within surface system 50 is a display interface 352, a telemetry transceiver 354, a processor 356, a peripheral interface 358, an information storage device 360, a network interface 362 and a memory 370. Bus 364 couples each of these elements to each other and transports their communications. Telemetry transceiver 354 enables the surface system 50 to communicate with the logging tool and its modules (either directly or indirectly), and network interface 362 enables communications with other systems (e.g., a central data processing facility via the Internet). In accordance with user input received via peripheral interface 358 and/or program instructions from memory 370 and/or information storage device 360, processor 356 processes telemetry information received via telemetry transceiver 354 to estimate the formation resistivity parameters in accordance with the disclosed methods and/or geosteering signals, and display them.

Surface system 50 communicates with logging tool module 202, which receives control messages from, and provides measurement data to, surface system 50 via telemetry transceiver 302. Controller and memory 304 couples to telemetry transceiver 302, power source 306, information storage device 308, a short hop telemetry transceiver 312 and one or more receive and/or transmit antennas 314, coordinating the operation of the various components. In some illustrative embodiments transmit/receive antenna(s) 314 measures voltages induced within the surrounding formation by electromagnetic signals 322 transmitted by logging tool module 206, said measured voltages reflecting the electrical characteristics of the surrounding formation. In other embodiments, controller and memory 304 causes transmit/receive antenna(s) 314 to transmit electromagnetic signals 324 and induce voltages within the surrounding formation that are subsequently measured by logging tool module 206. The measurements are communicated by wireless signal 326 from logging tool module 206 to logging tool module 302 via short hop telemetry transceiver 312. Alternatively, the measurements may be communicated by electrical conductor or optical fiber. The measurement information is forwarded to controller and memory 304 for storage within information storage device 308, with at least some of this information being communicated to surface system 50.

Logging tool module 206 includes a power source 330, controller and memory 332, short hop telemetry transceiver 336 and transmit/receive antenna(s) 338, each coupled to each other and operating in a manner similar to the corresponding components of logging tool module 202. In some embodiments, logging tool module 206 transmits electromagnetic signals 322 and logging tool module 202 measures voltages induced in the surrounding formation by electromagnetic signals 322, while in others logging tool module 206 measures the voltages induced within the formation by electromagnetic signals 324 transmitted by logging tool module 202. Logging tool modules 202 and 206 exchange information via short hope telemetry transceivers 312 and 336 that can include electromagnetic signal measurements, transmit/receive synchronization signals and configuration and control commands. This information may originate from any component within the system, including but not limited to controller and memory 304 and 332, and surface system 50. The power sources 306 and 330 used to power the downhole components of logging tool modules 202 and 206 may include batteries, vibration energy harvesters, turbines, electrical generators or any other suitable mechanism. Transmit/receive antennas 314 and 338 may include any of a number of antennas, including but not limited to azimuthally sensitive antennas such as triaxial coils and tilted loop antennas. Short hop telemetry transceivers 312 and 336 may use any suitable short hop downhole wired, wireless or optically coupled communications technique. Also, additional sensors (not shown) may also be incorporated into each logging tool module and can include temperature, pressure, lubrication, vibration, strain and density sensors to monitor drilling conditions.

Surface system processor 356 and logging tool module controllers and memories 304 and 332 each generally operates in accordance with one or more programs stored on an information storage medium (e.g., information storage device 360). These programs cause the controller and/or processing system to carry out at least part of the methods disclosed herein. For simplicity, the description of the method that follows assumes that each of the modules performing the described functions are all resident within memory 370 and executed by processor 356 of surface system 50 (as shown in FIG. 4). Nonetheless, it is contemplated that one or more of these functions may be performed by modules resident in memory within one of logging tool modules 202 or 206, and executed by a corresponding downhole processor and/or controller.

Various software modules are shown loaded into memory 370 of FIG. 4, where they are each accessed by processor 356 for execution. These modules include: user interface module 372, which processes user inputs provided with keyboard 54 and pointing device 55 via peripheral interface 358; transmit module 374, which controls the transmission of the electromagnetic signal used to induce voltages within the formation; receive module 376 which controls the sampling and measurement of the induced voltages; horizontal conductivity estimation module 378, which performs an initial estimate of $\sigma_h$ based on the measured voltages; boundary estimation module 380, which estimate the depth of the bed boundaries based on variances in the measured voltages; 0D inversion module 382, which performs a 0-dimensional inversion to estimate vertical and horizontal conductivities; 1D inversion module 384 which performs one or more 1-dimensional inversions to determine various formation parameters; threshold module 386, which optionally tests a mismatch criteria against a threshold value to determine whether one or more 1-dimensional inversion are to be performed; and presentation module 388, which presents the results of one or more inversions, e.g., on a display device.

Figure 5A:
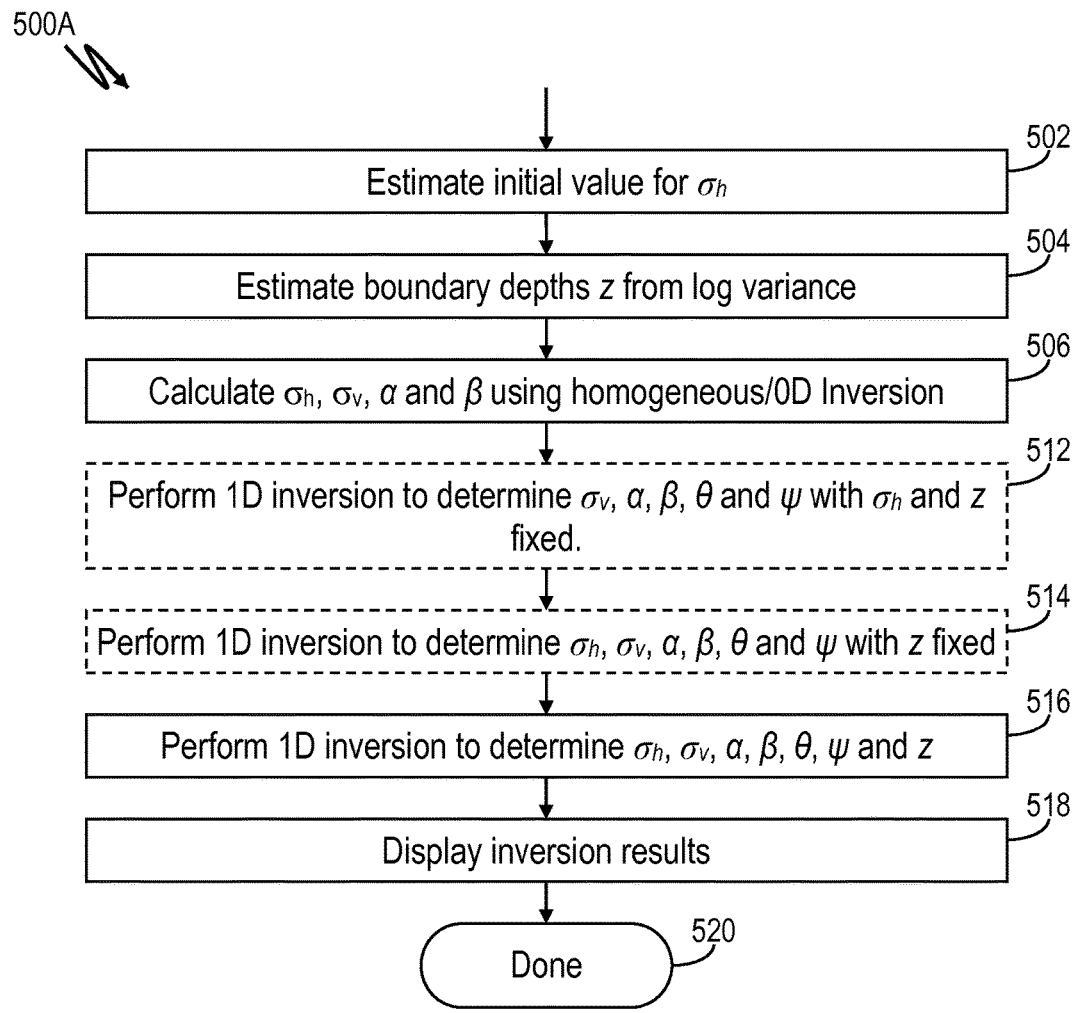
FIGS. 5A-5C are flowcharts of three illustrative resistivity estimation method embodiments.

Referring now to both the illustrative system 300 of FIG. 4 and the illustrative multi-stage inversion method 500A of FIG. 5A, the method begins by using formation resistivity measurements acquired by logging tool 210 to estimate an initial value for the formation's horizontal conductivity $\sigma_h$ ($\sigma_h$ estimation module 378 and block 502). This estimate may be determined using any of a number of known processing techniques (e.g., ZZ-Array processing), and all such techniques are within the scope of the present disclosure. The depth (z coordinate) of each of the bed boundaries within the formation is also estimated based on variances of the logged data acquired by logging tool 210 (z estimation module 380 and block 504). Such variances are determined based upon a combined conductivity reading expressed as $a \cdot \sigma_{zz} - b \cdot \sigma_{xx}$, where a and b are two optimally selected scalar values. In at least some illustrative embodiments, the variances are computed for each of the logging data samples within a depth window while operating the tool at its maximum vertical resolution. Each of the samples with peak variance values above a threshold are identified as bed boundaries. These identified boundaries are processed and filtered further to ensure that only one bed boundary is identified within a given depth window, thus defining the individual formation bed layers.

To provide an initial formation model for further 1-dimensional inversion, in at least some illustrative embodiments an inversion assuming a "0-dimensional" (i.e., infinite homogeneous formation) model is performed for each defined bed layer using data samples acquired at the midpoint depth within each layer (0D inversion module 382 and block 506). This inversion may be performed, for example, using a constrained Levenberg-Marquardt nonlinear minimization technique. In such a technique a non-linear problem is iteratively solved by defining and minimizing a cost function such as, for example:

$$C(P) = \frac{1}{2}[\|e(P)\|^2], \quad (7)$$

wherein e(P) is a residual vector, described in more detail below. The previously estimated horizontal conductivity is used as an initial value for $\sigma_h$ by the 0-dimensional inversion, which estimates four parameters: horizontal conductivity $\sigma_h$, vertical conductivity $\sigma_v$, dip angle $\alpha$ and azimuth angle $\beta$. Because of the reduced number of parameters and the use of a 0-dimensional homogenous inversion, analytical formulations may be used to perform forward modeling wherein forward difference calculations for the Jacobian matrix can be performed without the need to first approximate the Jacobian. The use of Jacobian matrices as part of an inversion process and techniques for accelerating the computation of Jacobian matrices are well known in the art and not discussed further.

It should be noted that the estimated values for $\alpha$ and $\beta$ actually represent the differences between $\alpha$ and $\theta$, and $\beta$ and $\psi$, respectively, i.e., the relative formation dip and azimuth. As a result, the $\alpha$ and $\beta$ values estimated by the 0-dimensional inversion are generally not suitable for use as initial values for boundary orientation in subsequent inversion steps.

After completing the 0-dimensional inversion, one or more 1-dimensional inversions are performed (1D inversion module 384 and blocks 512-516). These inversions are used to determine formation parameter vectors P that reproduce the values measured by logging tool 210. As previously noted, this determination is achieved by iteratively solving a non-linear problem wherein an objective cost function is defined and minimized. In at least some illustrative embodiments, the cost function is defined as shown in equation (7), with the residual vector e(P) being defined as:

$$e(P) = \begin{bmatrix} S_1(P) - m_1 \\ S_2(P) - m_2 \\ \vdots \\ S_k(P) - m_k \\ \vdots \\ S_M(P) - m_M \end{bmatrix}, \quad (8)$$

where $S_k(P)$ is the modeled tool response vector for a parameter vector P within a given foundation layer k, and $m_k$ is the actual corresponding measured response vector for the same layer. The operation $\|e(P)\|^2$ refers to the L2-norm of e(P). Also, as explained further below, the M formation layers processed to perform the inversion and compute the residual vector may be less than the total number of layers L.

In at least some illustrative embodiments, the disclosed 1-dimensional inversion is first used to estimate $\sigma_v$, $\alpha$, $\beta$, $\theta$ and $\psi$ while keeping $\sigma_h$ and z fixed for each bedding layer (1D inversion module 384 and block 512). For example, $\sigma_h$ may be maintained at its initial value (obtained from the 0-dimensional inversion) while z is maintained at the depth value for the midpoint of the bedding layer being processed. By fixing both the horizontal conductivity and formation depth values, the number of unknown parameters that must be estimated by the inversion is reduced, thus enhancing the efficiency and stability of the 1-dimensional inversion as compared to having additional unknown parameters. Because this stage is used to estimate initial values for the next stage, the cost function tolerance value used to stop the iterative process is selected so as to end the inversion in just a few steps (e.g., 1-100).

A second 1-dimensional inversion may optionally be performed that again uses the $\sigma_h$ value estimated by the 0-dimensional inversion as an initial value while using the parameter vector produced by the first 1-dimensional inversion to provide the remaining initial values. This second 1-dimensional inversion estimates $\sigma_h$, $\sigma_v$, $\alpha$, $\beta$, $\theta$ and $\psi$ while keeping only z fixed for each bedding layer (1D inversion module 384 and block 514). Although this increases the number of unknowns, the improved initial values provided by the previous stage help to reduce the number of iterations needed to reach the tolerance value. As before, because this stage is used to estimate initial values for the next stage, the cost function tolerance value used to stop the iterative process is also selected so as to end the inversion in just a few steps (e.g., 1-100).

A third 1-dimensional inversion estimates $\sigma_h$, $\sigma_v$, $\alpha$, $\beta$, $\theta$, $\psi$ and z without keeping any values fixed (1D estimation module 384 and block 516) using the estimated values from the second 1-dimensional inversion for all of its initial values. As before, the increased number of unknowns is offset by the improved initial values provided by the previous inversion stage, thus enabling this third inversion stage to converge quickly and provide the final inversion results. These results are sent to a display (e.g., display 56) e.g., so they can be presented to a user (presentation module 388, block 518), ending method 500A (block 520). It should be noted that because the inversion stages of blocks 512 and 514 are used to provide improved initial values, these steps are optional as indicated in FIG. 5A, and either or both blocks may be omitted.

As previously noted, each of the inversion stages and the associated computations do not have to be performed on all L formation layers concurrently, but instead may performed sequentially on groups or subsets of M layers where M<L. In at least some illustrative embodiments, the inversions are performed on M layers, e.g., 1 through M, and upon completion of the multi-stage inversion layer 1 is marked as known. In this example, a second group of M layers is then identified that includes layers 2 through M+1, and the process is repeated. This layer-sliding inversion scheme is repeated until all L layers are processed.

Figure 5B:
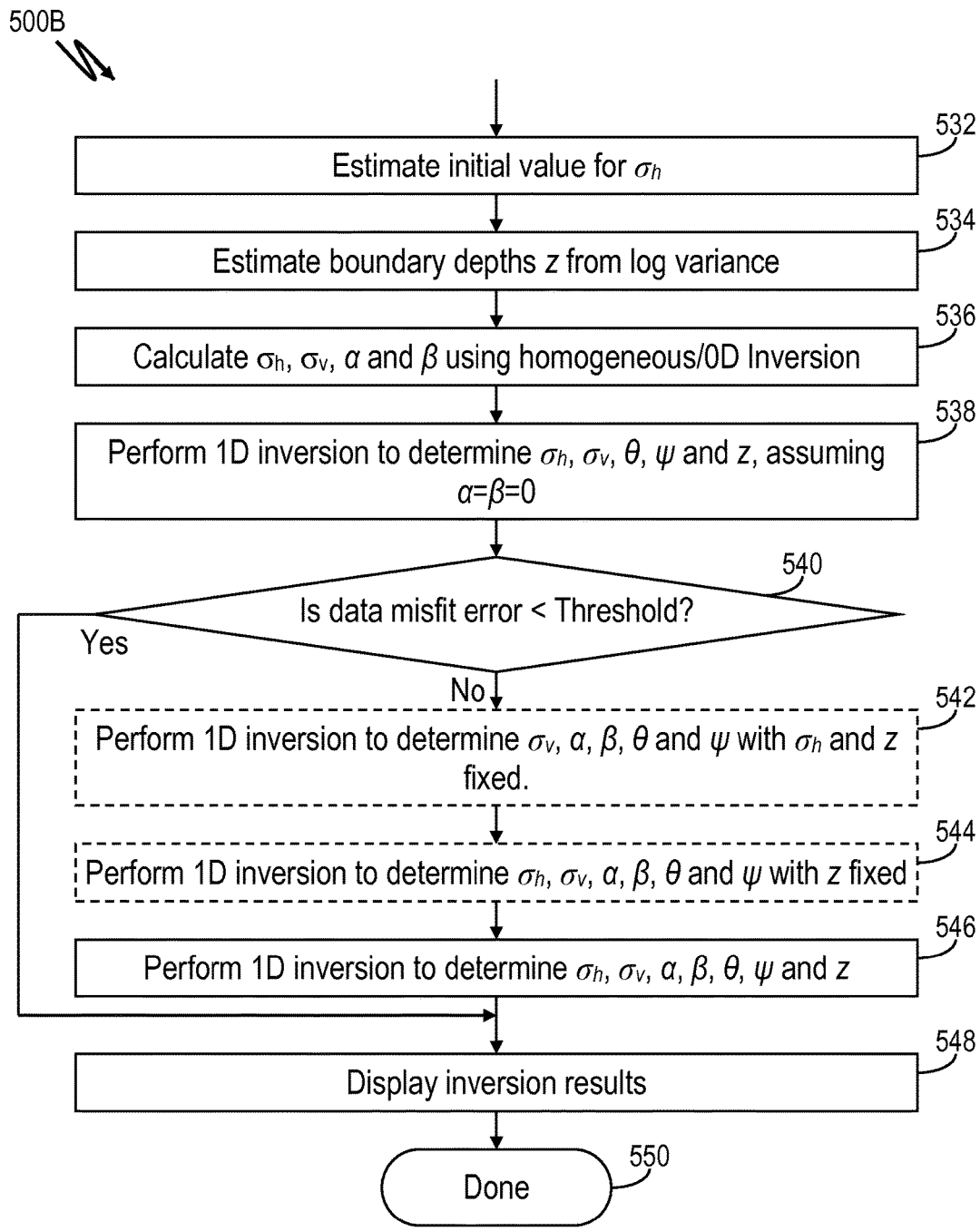

The multi-stage inversion method of FIG. 5A may be further modified to take into account the possibility that in some cases most of the formation layers may not possess a fast changing dip angle. For such formations, a single 1D inversion that assumes a dip and azimuth angle of zero can provide results that are adequately accurate, without the need to perform the full multi-stage inversion previously described. The method 500B of FIG. 5B illustrates an example of such a conditionally executed multi-stage inversion. In at least some illustrative embodiments, the initial estimates of both the initial horizontal conductivity $\sigma_h$ ($\sigma_h$ estimation module 378 and block 532) and the bed boundary locations z (z estimation module 380 and block 534) are determined in the same manner as in method 500A of FIG.

5A, with the same 0-dimensional inversion as method 500A also being performed by method 500B (0D inversion module 382 and block 536).

The results of the 0-dimensional inversion of block 536 are used as initial values for a 1-dimensional inversion that estimates $\sigma_h$, $\sigma_v$, $\theta$, $\psi$ and z while maintaining $\alpha=\beta=0$, i.e., a formation with mostly horizontal layers is assumed (1D inversion module 384 and block 538). A data misfit error is then computed between the modeled tool response for a parameter vector P within each foundation layer k and the actual corresponding measured response for the same layer. This data misfit error may be computed, for example, using the cost function of equation (7). If the error is less than a previously defined threshold value (TH module 386 and block 540), most or all of the formation layers do not have a fast changing dip angle and the parameter vector estimated in block 538 is sent to be displayed, e.g., to be presented to the user as the final results (presentation module 388 and block 548), ending method 500B (block 550).

If the data misfit error exceeds the threshold value (TH module 386 and block 540), the formation does have a significant number of layers with fast changing dip angles, and the multi-stage inversion previously described is performed to determine $\sigma_h$, $\sigma_v$, $\alpha$, $\beta$, $\theta$, $\psi$ and z (1D inversion module 384 and blocks 542-546). The results of the multi-stage inversion are displayed (presentation module 388 and block 548), ending method 500B (block 550).

Figure 5C:
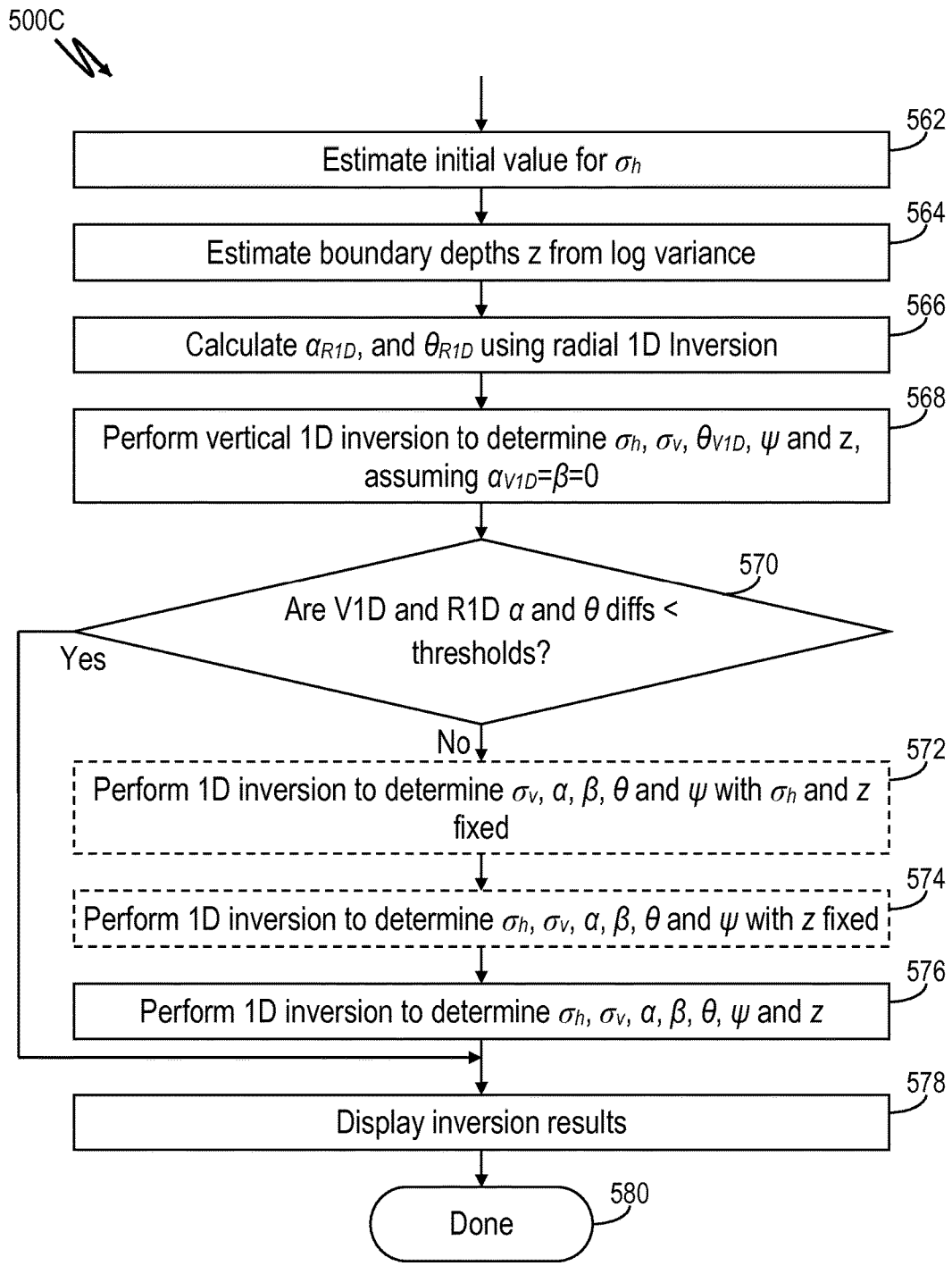

A third multi-stage inversion method 500C is shown in FIG. 5C. In at least some illustrative embodiments implementing this method, the initial estimates of both the initial horizontal conductivity $\sigma_h$ ($\sigma_h$ estimation module 378 and block 532) and the bed boundary locations z (z estimation module 380 and block 534) are determined in the same manner as in method 500B of FIG. 5B. The initial horizontal conductivity and bed boundaries are subsequently used by a radial 1-dimensional inversion to calculate formation dip and tool inclination angles $\alpha_{RID}$ and $\theta_{RID}$ respectively (1D inversion module 384 and block 566). The results of the 0-dimensional inversion of block 536 are also used as initial values for a 1-dimensional inversion that estimates $\sigma_h$, $\sigma_v$, $\theta_{VID}$, $\psi$ and z while maintaining $\alpha_{VID}=\beta=0$, i.e., a fixed, horizontal formation layer is assumed (1D inversion module 384 and block 568).

Once estimated, the differences between the radial and vertical dip and inclination angles are compared and if the differences are less than a threshold value (TH module 386 and block 570), most or all of the formation layers do not have a fast changing dip angle and the parameter vector estimated in block 568 is displayed as the final results (presentation module 388 and block 578), ending method 500B (block 580). The thresholds may be established, for example, based on the magnitude of the difference (in degrees), as well as the length of the deviation (in feet or meters). If the dip and inclination angle differences exceed the threshold value (TH module 386 and block 570), the formation does have a significant number of layers with fast changing dip angles, and the multi-stage inversion previously described is performed to determine $\sigma_h$, $\sigma_v$, $\alpha$, $\beta$, $\theta$, $\psi$ and z (1D inversion module 384 and blocks 572-576). The results of the multi-stage inversion are displayed, e.g., to present to a user (presentation module 388 and block 578), ending method 500B (block 580).

Embodiments disclosed herein include:

A. A fast-changing dip formation resistivity estimation method that includes estimating an initial horizontal resistivity based upon acquired formation logging data and determining an initial value set of one or more value sets. The method also includes determining each additional value set of the one or more value sets using a 1-dimensional inversion initialized with a previously determined value set of the one or more value sets and displaying a final value set of the one or more value sets. Each of the 1-dimensional inversions is performed using a horizontally layered cross-bedded formation model. One or more value sets includes one or more parameters selected from the group consisting of a horizontal resistivity, a vertical resistivity, a formation dip angle, a formation azimuth angle, a tool inclination angle, a tool azimuth angle and a depth.

B. A fast-changing dip formation resistivity estimation system, including one or more processors and one or more memories coupled to the one or more processors. The one or more memories include software that causes the one or more processors to estimate an initial horizontal resistivity based upon acquired formation logging data and to determine an initial value set of one or more value sets. The software further causes the one or more processors to determine each additional value set of the one or more value sets using a 1-dimensional inversion initialized with a previously determined value set of the one or more value sets, and to display a final value set of the one or more value sets. Each of the 1-dimensional inversions is performed using a horizontally layered cross-bedded formation model. Each of the one or more value sets includes one or more parameters selected from the group consisting of a horizontal resistivity, a vertical resistivity, a formation dip angle, a formation azimuth angle, a tool inclination angle, a tool azimuth angle and a depth.

Each of the embodiments, A and B, may have one or more of the following additional elements in any combination. Element 1: determining the initial value set includes determining a first horizontal resistivity and a first vertical resistivity using a homogenous 0-dimensional inversion that is initialized with the initial horizontal resistivity, and determining each of the one or more value sets includes determining the final value set by performing the 1-dimensional inversion initialized using the initial value set. Element 2: identifying formation layers by estimating one or more bed boundary depths based on logging data variances, determining a second value set at a fixed depth for each identified formation layer by performing the 1-dimensional inversion initialized using the initial value set, and setting one or more parameters of the initial value set to corresponding parameter values from the second value set before determining the final value set. Element 3: determining a third value set at a fixed depth for each identified formation layer by performing the 1-dimensional inversion initialized using the initial value set while maintaining a constant horizontal resistivity and setting one or more parameters of the initial value set to corresponding parameter values from the third value set before determining the second value set.

Element 4: determining a third value set at a fixed depth for each identified formation layer by performing the 1-dimensional inversion initialized using the initial value set while maintaining a constant horizontal resistivity and setting one or more parameters of the initial value set to corresponding parameter values from the third value set before determining the second value set. Element 5: identifying formation layers by estimating one or more bed boundary depths based on logging data variances and, if the data misfit error equals or exceeds a threshold value, determining a third value set at a fixed depth for each identified formation layer by performing the 1-dimensional inversion initialized using the initial value set and setting one or more parameters of the initial value set to corresponding parameter values from the third value set before determining the final value set. Element 6: if the data misfit error equals or exceeds a threshold value, determining a fourth value set at a fixed depth for each identified formation layer by performing the 1-dimensional inversion initialized using the initial value set while maintaining a constant horizontal resistivity and setting one or more parameters of the initial value set to corresponding parameter values from fourth value set before determining the third value set.

Element 7: determining a second value set by performing a radial homogeneous 0-dimensional inversion that is initialized using the initial horizontal resistivity, wherein determining the initial value set includes performing a vertical 1-dimensional inversion initialized using the initial horizontal resistivity with the formation dip angle and the formation azimuth angle set equal to zero degrees and wherein determining each of the one or more value sets includes computing angle differences between the radial and vertical inversion formation dip angles and between the radial and vertical inversion tool inclination angles; if the angle differences equal or exceed one or more threshold values, determining the final value set by performing the 1-dimensional inversion initialized using the initial value set, and if the angle differences do not exceed the one or more threshold values, setting the final value set to the initial value set.

Element 8: identifying formation layers by estimating one or more bed boundary depths based on logging data variances and, if the angle differences equal or exceed one or more threshold values, determining a third value set at a fixed depth for each identified formation layer by performing the 1-dimensional inversion initialized using the initial value set and setting one or more parameters of the initial value set to corresponding parameter values from the third value set before determining the final value set. Element 9: if the angle differences equal or exceed one or more threshold values, determining a fourth value set at a fixed depth for each identified formation layer by performing the 1-dimensional inversion initialized using the initial value set while maintaining a constant horizontal resistivity and setting one or more parameters of the initial value set to corresponding parameter values from the fourth value set before determining the third value set.

Element 10: a downhole tool that includes at least one of the one or more processors and further includes a multi-component induction tool that acquires the formation logging data. Element 11: a surface or remote computing system that includes at least one of the one or more processors, the surface or remote computing system being coupled to a downhole tool that includes a multi-component induction tool that acquires the formation logging data. Element 12: the software causes the one or more processors to estimate the formation resistivity in real-time, the system including a logging while drilling (LWD), a measurement while drilling (MWD) downhole tool or a wireline logging tool that acquires the formation logging data.

Numerous other modifications, equivalents, and alternatives, will become apparent to those skilled in the art once the above disclosure is fully appreciated. For example, although some of the examples and figures are presented within the context of a logging while drilling (LWD)/measurement while drilling (MWD) tool, it is understood that such systems and methods may also be used with a wireline logging tool or other similar logging tools. Further, while the cross-bedded formation model described is used as a proxy for a fast-changing dip angle formation, the systems and methods described may also be used to determine parameter vectors of formations that include actual cross-bedded formations. It is intended that the following claims be interpreted to embrace all such modifications, equivalents, and alternatives where applicable.

What is claimed is:

1. A changing dip formation resistivity estimation method that comprises:
    disposing a wireline logging tool into a borehole, wherein the wireline logging tool comprises:
        three sets of mutually orthogonal antennas that are disposed along a Z-axis of the wireline logging tool and wherein each set of mutually orthogonal antennas operate as a transmitter, a receiver, or a bucking receiver;
    estimating a first horizontal resistivity based upon acquired formation logging data from the three sets of mutually orthogonal antennas;
    applying a ZZ-Array with the first horizontal resistivity to find a first value set of one or more value sets;
    applying a 1-dimensional inversion initialized with a previously determined value set of the one or more value sets to find each additional value set of the one or more value sets; and
    displaying a final value set of the one or more value sets,
    wherein each of the 1-dimensional inversions is performed using a horizontally layered cross-bedded formation model; and
    wherein each of the one or more value sets comprises one or more parameters selected from the group consisting of a horizontal resistivity, a vertical resistivity, a plurality of formation dip angles, wherein each formation dip angle is measured between a cross-bedding's z-axis and a normal of a bed boundary, a formation azimuth angle, a tool inclination angle, a tool azimuth angle and a depth.

2. The method of claim 1, further comprising measuring the resistivity of a formation with a logging tool to provide the acquired logging data.

3. The method of claim 1, wherein determining the first value set comprises determining a first horizontal resistivity and a first vertical resistivity using a homogenous 0-dimensional inversion that is initialized with the first horizontal resistivity; and wherein determining each of the one or more value sets comprises determining the final value set by performing the 1-dimensional inversion initialized using the first value set.

4. The method of claim 3, wherein determining each of the one or more value sets comprises:
    identifying formation layers by estimating one or more bed boundary depths based on logging data variances;
    determining a second value set at a fixed depth for each identified formation layer by performing the 1-dimensional inversion initialized using the first value set; and
    setting one or more parameters of the first value set to corresponding parameter values from the second value set before determining the final value set.

5. The method of claim 4, wherein determining each of the one or more value sets further comprises:
    determining a third value set at a fixed depth for each identified formation layer by performing the 1-dimensional inversion initialized using the first value set while maintaining a constant horizontal resistivity; and
    setting one or more parameters of the first value set to corresponding parameter values from the third value set before determining the second value set.

6. The method of claim 1, wherein determining the first value set comprises determining a first horizontal resistivity and a first vertical resistivity using a homogenous 0-dimensional inversion that is initialized with the first horizontal resistivity; and
    wherein determining each of the one or more value sets comprises:
    determining a second value set by performing a 1-dimensional inversion initialized using the first value set with the formation dip angle and the formation azimuth angle set equal to zero degrees;
    computing a data misfit error based at least in part on the second value set;
    if the data misfit error equals or exceeds a threshold value, determining the final value set by performing the 1-dimensional inversion initialized using the first value set; and
    if the data misfit error does not exceed the threshold value, setting the final value set to the second value set.

7. The method of claim 6, wherein determining each of the one or more value sets further comprises:
    identifying formation layers by estimating one or more bed boundary depths based on logging data variances; and
    if the data misfit error equals or exceeds the threshold value:
    determining a third value set at a fixed depth for each identified formation layer by performing the 1-dimensional inversion initialized using the first value set; and
    setting one or more parameters of the first value set to corresponding parameter values from the third value set before determining the final value set.

8. The method of claim 7, wherein determining each of the one or more value sets further comprises:
    if the data misfit error equals or exceeds the threshold value:
    determining a fourth value set at a fixed depth for each identified formation layer by performing the 1-dimensional inversion initialized using the first value set while maintaining a constant horizontal resistivity; and
    setting one or more parameters of the first value set to corresponding parameter values from fourth value set before determining the third value set.

9. The method of claim 1, further comprising
    determining a second value set by performing a radial homogeneous 0-dimensional inversion that is initialized using the first horizontal resistivity,
    wherein determining the first value set comprises performing a vertical 1-dimensional inversion initialized using the first horizontal resistivity with the formation dip angle and the formation azimuth angle set equal to zero degrees; and
    wherein determining each of the one or more value sets comprises:
    computing angle differences between the radial and vertical inversion formation dip angles and between the radial and vertical inversion tool inclination angles;
    if the angle differences equal or exceed one or more threshold values, determining the final value set by performing the 1-dimensional inversion initialized using the first value set; and
    if the angle differences do not exceed the one or more threshold values, setting the final value set to the first value set.

10. The method of claim 9, wherein determining each of the one or more value sets further comprises:
    identifying formation layers by estimating the one or more bed boundary depths based on logging data variances; and
    if the angle differences equal or exceed one or more threshold values:
    determining a third value set at a fixed depth for each identified formation layer by performing the 1-dimensional inversion initialized using the first value set; and
    setting one or more parameters of the first value set to corresponding parameter values from the third value set before determining the final value set.

11. The method of claim 10, wherein determining each of the one or more value sets further comprises:
    if the angle differences equal or exceed the one or more threshold values:
    determining a fourth value set at a fixed depth for each identified formation layer by performing the 1-dimensional inversion initialized using the first value set while maintaining a constant horizontal resistivity; and
    setting one or more parameters of the first value set to corresponding parameter values from the fourth value set before determining the third value set.

12. A changing dip formation resistivity estimation system, comprising:
    a logging while drilling tool comprising:
        a bottom hole assembly;
        a steering mechanism, wherein the steering mechanism is connected to the bottom hole assembly and wherein the steering mechanism is a plurality of controllable fins, drilling plows, or bent subs;
        a drill bit, wherein the drill bit is connected to the bottom hole assembly;
    one or more processors; and
    one or more memories coupled to the one or more processors, the one or more memories comprising software that causes the one or more processors to:
        estimate a first horizontal resistivity based upon acquired formation logging data;
        apply a ZZ-Array with the first horizontal resistivity to find a first value set of one or more value sets;
        apply a 1-dimensional inversion initialized with a previously determined value set of the one or more value sets to find each additional value set of the one or more value sets;
        send a final value set of the one or more value sets to a display, and
        wherein each of the 1-dimensional inversions is performed using a horizontally layered cross-bedded formation model;
        wherein each of the one or more value sets comprises one or more parameters selected from the group consisting of a horizontal resistivity, a vertical resistivity, a plurality of formation dip angles, wherein each formation dip angle is measured between a cross-bedding's z-axis and a normal of a bed boundary, a formation azimuth angle, a tool inclination angle, a tool azimuth angle and a depth; and
        control the steering mechanism to change a path of the logging while drilling tool in a formation based at least in part on the final value set of the one or more value sets.

13. The system of claim 12, wherein the acquired formation logging data is provided by a logging tool that measures the resistivity of a formation.

14. The system of claim 12, wherein causing the one or more processors to determine the first value set comprises determining a first horizontal resistivity and a first vertical resistivity using a homogenous 0-dimensional inversion that is initialized with the first horizontal resistivity; and wherein causing the one or more processors to determine each of the one or more value sets comprises determining the final value set by performing the 1-dimensional inversion initialized using the first value set.

15. The system of claim 14, wherein the software further causes the one or more processors to:

identify formation layers by estimating one or more bed boundary depths based on logging data variances;

determine a second value set at a fixed depth for each identified formation layer by performing the 1-dimensional inversion initialized using the first value set; and set one or more parameters of the first value set to corresponding parameter values from the second value set before determining the final value set.

16. The system of claim 15, wherein the software further causes the one or more processors to:

determine a third value set at a fixed depth for each identified formation layer by performing the 1-dimensional inversion initialized using the first value set while maintaining a constant horizontal resistivity; and set one or more parameters of the first value set to corresponding parameter values from the third value set before determining the second value set.

17. The system of claim 12, wherein causing the one or more processors to determine the first value set comprises determining a first horizontal resistivity and a first vertical resistivity using a homogenous 0-dimensional inversion that is initialized with the first horizontal resistivity; and wherein causing the one or more processors to determine each of the one or more value sets comprises:

determining a second value set by performing a 1-dimensional inversion initialized using the first value set with the formation dip angle and the formation azimuth angle set equal to zero degrees;

computing a data misfit error based at least in part on the second value set;

if the data misfit error equals or exceeds a threshold value, determining the final value set by performing the 1-dimensional inversion initialized using the first value set; and if the data misfit error does not exceed the threshold value, setting the final value set to the second value set.

18. The system of claim 17, wherein the software further causes the one or more processors to:

identify formation layers by estimating one or more bed boundary depths based on logging data variances; and if the data misfit error equals or exceeds the threshold value:

determine a third value set at a fixed depth for each identified formation layer by performing the 1-dimensional inversion initialized using the first value set; and set one or more parameters of the first value set to corresponding parameter values from the third value set before determining the final value set.

19. The system of claim 18, wherein the software further causes the one or more processors to:

if the data misfit error equals or exceeds the threshold value:

determine a fourth value set at a fixed depth for each identified formation layer by performing the 1-dimensional inversion initialized using the first value set while maintaining a constant horizontal resistivity; and set one or more parameters of the first value set to corresponding parameter values from the fourth value set before determining the third value set.

20. The system of claim 12, wherein the software further causes the one or more processors to:

determine a second value set by performing a radial homogeneous 0-dimensional inversion that is initialized using the first horizontal resistivity, wherein causing the one or more processors to determine the first value set comprises performing a vertical 1-dimensional inversion initialized using the first horizontal resistivity with the formation dip angle and the formation azimuth angle set equal to zero degrees; and wherein causing the one or more processors to determine each of the one or more value sets comprises:

computing angle differences between the radial and vertical inversion formation dip angles and between the radial and vertical inversion tool inclination angles;

if the angle differences equal or exceed one or more threshold values, determining the final value set by performing the 1-dimensional inversion initialized using the first value set; and if the angle differences do not exceed the one or more threshold values, setting the final value set to the first value set.

21. The system of claim 20, wherein the software further causes the one or more processors to:

identify formation layers by estimating one or more bed boundary depths based on logging data variances; and if the angle differences equal or exceed the one or more threshold values:

determine a third value set at a fixed depth for each identified formation layer by performing the 1-dimensional inversion initialized using the first value set; and set one or more parameters of the first value set to corresponding parameter values from the third value set before determining the final value set.

22. The system of claim 21, wherein the software further causes the one or more processors to:

if the angle differences equal or exceed the one or more threshold values:

determine a fourth value set at a fixed depth for each identified formation layer by performing the 1-dimensional inversion initialized using the first value set while maintaining a constant horizontal resistivity; and set one or more parameters of the first value set to corresponding parameter values from the fourth value set before determining the third value set.

23. The system of claim 12, wherein a downhole tool comprises at least one of the one or more processors and further comprises a multi-component induction tool that acquires the formation logging data.

24. The system of claim 12, wherein a surface or remote computing system comprises at least one of the one or more processors and wherein the surface or remote computing system is coupled to a downhole tool comprising a multi-component induction tool that acquires the formation logging data.

25. The system of claim 12, wherein the software causes the one or more processors to estimate the formation resistivity in real-time and wherein the system comprises the logging while drilling tool (LWD), a measurement while drilling (MWD) downhole tool or a wireline logging tool that acquires the formation logging data.

26. A changing dip formation resistivity estimation system, comprising:

a logging while drilling tool comprising:

a bottom hole assembly;
a steering mechanism, wherein the steering mechanism is connected to the bottom hole assembly and wherein the steering mechanism is a plurality of controllable fins, drilling plows, or bent subs;
a drill bit, wherein the drill bit is connected to the bottom hole assembly;
one or more processors; and
one or more memories coupled to the one or more processors, the one or more memories comprising software that causes the one or more processors to:
estimate a first horizontal resistivity based upon acquired formation logging data;
apply a ZZ-Array with the first horizontal resistivity to find a first value set of one or more value sets;
apply a 1-dimensional inversion initialized with a previously determined value set of the one or more value sets to find each additional value set of the one or more value sets;
send a final value set of the one or more value sets to a display, and
wherein each of the 1-dimensional inversions is performed using a horizontally layered cross-bedded formation model;
wherein each of the one or more value sets comprises one or more parameters selected from the group consisting of a horizontal resistivity, a vertical resistivity, a plurality of formation dip angles, wherein each formation dip angle is measured between a cross-bedding's z-axis and a normal of a bed boundary, a formation azimuth angle, a tool inclination angle, a tool azimuth angle and a depth;
control the steering mechanism to change a path of the logging while drilling tool in a formation based at least in part on the final value set of the one or more value sets;
determine a second value set by performing a radial homogeneous 0-dimensional inversion that is initialized using the first horizontal resistivity,
wherein causing the one or more processors to determine the first value set comprises performing a vertical 1-dimensional inversion initialized using the first horizontal resistivity with the formation dip angle and the formation azimuth angle set equal to zero degrees; and
wherein causing the one or more processors to determine each of the one or more value sets comprises:
compute angle differences between the radial and vertical inversion formation dip angles and between the radial and vertical inversion tool inclination angles;
if the angle differences equal or exceed one or more threshold values, determining the final value set by performing the 1-dimensional inversion initialized using the first value set; and
if the angle differences do not exceed the one or more threshold values, setting the final value set to the first value set.

* * * * *